United States Patent Office 3,462,389
Patented Aug. 19, 1969

3,462,389
POLYOLEFINIC COMPOSITIONS HAVING IMPROVED MECHANICAL PROPERTIES
Felix Schulde, Neuenhain, Taunus, and Dietrich Schleede, Frankfurt am Main, Germany, assignors to Hercules Incorporated, Wilmington, Del., a corporation of Delaware
No Drawing. Continuation-in-part of application Ser. No. 71,636, Nov. 25, 1960. This application Mar. 4, 1966, Ser. No. 531,750
Claims priority, application Germany, Nov. 25, 1959, F 29,923
Int. Cl. C08f 45/04, 29/02
U.S. Cl. 260—41    7 Claims

ABSTRACT OF THE DISCLOSURE

The mechanical properties and particularly the hardness, stiffness and toughness of high density polyethylene or polypropylene are improved without adversely affecting processability or thermal stability under load by adding to the polymer from 10 to 100%, by weight of the polymer, of a zinc pigment such as zinc oxide, zinc sulfide or mixtures thereof.

---

This application is a continuation-in-part of our copending application Ser. No. 71,636, filed Nov. 25, 1960, now abandoned.

The present invention relates to polyolefinic compositions and particularly to polymeric compositions of high density polyethylene or polypropylene having improved mechanical properties and containing from 10 to 100%, and preferably from 10 to 60%, by weight of the polymer of a zinc pigment or a mixture of different zinc pigments.

For reasons of economy it is often desirable to blend thermoplastics with inexpensive additives such as fillers. Although such additives in general tend to improve to some extent the hardness and stiffness of the plastics, these improvements are usually associated with decreased melt flow, which means poorer processability, and with reduced toughness of the plastic. For the processing of polyolefins on extrusion or injection molding machines, this decrease in melt flow is a serious drawback. Since one of the advantages of polyolefins over thermosetting plastics and other thermoplastic materials lies in their good resistance to shock and impact, reduced toughness is also a serious disadvantage for many end uses. Attempts to improve the toughness of polyolefins without impairing the other desirable mechanical properties of the polymer using prior art additives, such as, for example, elastomers or plasticizers, have also been unsuccessful. For example, the presence of the rubberlike polyisobutylene in polypropylene reduces the hardness and stiffness of the polymer; and the use of plasticizers at the level necessary to improve toughness seriously affects the other mechanical properties of the polymer.

It has also been suggested to add relatively large amounts of pulverulent calcium carbonate, particularly in an activated form, or coke to improve the mechanical properties or increase the softening temperature of low density polyethylene. Such additives, for the most part, must have a very small particle size and are difficult to incorporate into the polymer without using relatively high molding pressures and temperatures below the yield point of the polymer. Thus, such materials are not suited to commercial injection molding techniques.

It is known from U.S. Patent 3,029,224 that polyolefins containing certain amine or phenolic stabilizers can be stabilized against thermooxidative decomposition by the addition of 1.5 to 2.0% of zinc sulfide and from U.S. Patent 3,111,499 that polyolefins can be stabilized against aging and embrittlement by the addition of 0.1 to 5.0% of zinc oxide and 0.1 to 5.0% sulfur. Such additives are solely for improving the heat stability of the polyolefin, and at the level employed have substantially no effect on the hardness or other mechanical properties of polyolefins containing them.

In accordance with the present invention it has been found that not only can the hardness, stiffness, toughness, and heat stability of high density polyethylene and polypropylene be improved but that the processability and the thermal stability under load are not adversely affected by incorporating into the polymer from 10 to 100%, and preferably from 10 to 60%, based on the weight of the polymer, of a zinc pigment such as zinc sulfide, zinc oxide, or mixtures thereof. The fact that the addition of relatively large amounts of zinc sulfide and/or zinc oxide improve the impact strength and notched impact strength of stereoregular or isotactic polypropylene and linear polyethylenes of a density of 0.94 to 0.97 without affecting processability was indeed unexpected since these same additives do not produce a similar effect with low density polyethylene.

The zinc pigments of this invention can be incorporated into high density polyethylene or polypropylene using any of the known techniques for homogeneously blending a polymer with an additive, as, for example, by mixing on a roll mill or an extruder, with subsequent granulation if desired. Other additives, such as wetting agents, lubricants, dyestuffs, heat and light stabilizers, and the like, can also be admixed with the polymer, provided, of course, they do not detract from the advantages of the invention. Because of their excellent mechanical properties, the products of the invention have a wide range of application. Their good surface hardness and scratch and break resistance make them particularly suitable for use in the manufacture of household articles such as buckets, dishes, tableware, kitchen strainers, storage containers, cutlery boxes, cutlery, egg cups, tea eggs, parts of kitchen machinery, dishwashing machines, laundry baskets, tubs, dustpans, watering cans, garden tools, flower boxes and baskets, toys, toiletware such as soap boxes and combs sanitary articles such as lavatory bowls, toilet seats, wash basins, bathtubs, and shower basins. For these articles the somewhat higher weight of the mixture is often of advantage because the articles will stand more firmly. Their good thermostability, impact strength, and dimensional stability make them useful in fields of application where previously polyolefins found very limited use, as, for example, dye spools. The compositions of this invention are also useful for washing machine parts, warm water pipes, machine casings and coverings, boxes, fans, valves, fittings, armatures, automotive parts, protective helmets, heels, buttons, screw caps and closures, accessories in the electrical and radio fields, cable insulation, tubes, profiles, and the like, as well as bottles, cans, and the like.

The invention is illustrated by the following examples wherein the effectiveness of the addition of zinc pigments to polypropylene and high density polyethylene in amounts ranging from 5 to 150% by weight of the polymer on notched impact strength, hardness (Ball indentation), flexibility under load, and processability (melt flow) is demonstrated. Test results thereof are compared with the same polymer containing no zinc pigment in Tables 1 and 2, and are compared with a low density polyethylene in Table 3. The compositions for the examples were prepared by blending 10 to 12 kgs. of the polyolefin with a commercial stabilizer and the desired amount of zinc pigment in a rapid mixer for 10 minutes, extruding the blend through a short compression extruder (45 mm. screw dieameter, length 17 D) into noodles, and then granulating the noodles. Test samples were then produced from the compositions by injection molding. The isotactic polypropylene used in Table 1 had a density of 0.907, a reduced specific viscosity (hereinafter refered to as RSV) of 3.3, and a melt index of 7.26 ($I_5$ at 250° C.). The linear polyethylene of Table 2 had a density of 0.944, an RSV of 2.3, and a melt index ($I_5$ at 190° C.) of 3.8, and the low density polyethylene of Table 3 had a density of 0.917, an RSV of 1.3, and a melt index ($I_2$ at 190° C.) of 3.8. Melt index as used herein and in the tables as $I_2$ or $I_5$ was determined by ASTM method 1238–52T, the subscript indicating either a 2 or 5 kg. load. Melt flow as used in the tables is the value obtained by dividing the melt index ($I_5$) by density (lift method), a temperature of 250° C. being used when the polymer was polypropylene and a temperature of 190° C. for linear and low density polyethylene. Notched impact strength values were determined according to DIN53453, hardness by Ball indentation after 10 seconds in accordance with DIN57302, and flexural strength in accordance with DIN53452, at a deflection of 6 mm.

TABLE 1

| Polymer | Filler | Amount of filler (percent by weight) of polymer | Notched impact strength (cmkg./cm.²) | Hardness (kg./cm.²) | Flexural strength (kg./cm.²) | Melt flow |
|---|---|---|---|---|---|---|
| Isotactic polypropylene. | ZnS | 0 | 3.7 | 700 | 500 | 8.0 |
| | | 5 | 4.2 | 708 | 524 | 8.0 |
| | | 20 | 5.2 | 735 | 522 | 7.9 |
| | | 40 | 6.2 | 750 | 507 | 7.9 |
| | | 60 | 6.2 | 770 | 505 | 7.9 |
| | | 80 | 6.2 | 790 | 495 | 7.7 |
| | | 100 | 5.2 | 840 | 480 | 7.7 |
| | | 150 | 4.1 | 900 | 470 | 7.7 |
| | ZnO | 0 | 3.7 | 700 | 500 | 8.0 |
| | | 5 | 5.0 | 705 | 509 | 12.0 |
| | | 20 | 5.2 | 750 | 510 | 16.0 |
| | | 40 | 5.7 | 756 | 513 | 12.0 |
| | | 60 | 6.5 | 770 | 510 | 7.3 |
| | | 80 | 7.2 | 793 | 500 | 7.1 |
| | | 100 | 9.9 | 820 | 495 | 7.0 |
| | | 150 | 5.0 | 990 | 480 | 6.5 |
| | ZnS/ZnO | 5/35 | 8.8 | 750 | 480 | 9.5 |
| | | 5/55 | 9.5 | 765 | 485 | 9.0 |

TABLE 2

| Polymer | Filler | Amount of filler (percent by weight) of polymer | Notched impact strength (cmkg./cm.²) | Hardness (kg./cm.²) | Flexural strength (kg./cm.²) | Melt flow |
|---|---|---|---|---|---|---|
| Linear polyethylene. | ZnS | 0 | 10.5 | 433 | 330 | 4.03 |
| | | 5 | 11.0 | 434 | 325 | 4.10 |
| | | 20 | 12.0 | 436 | 316 | 4.25 |
| | | 40 | 12.4 | 447 | 330 | 4.06 |
| | | 60 | 13.6 | 458 | 329 | 4.20 |
| | | 80 | 13.2 | 472 | 315 | 3.49 |
| | ZnO | 0 | 10.5 | 433 | 330 | 4.03 |
| | | 5 | 11.6 | 435 | 329 | 4.11 |
| | | 20 | 12.2 | 438 | 330 | 4.25 |
| | | 40 | 14.9 | 464 | 325 | 4.3 |
| | | 60 | 18.4 | 469 | 335 | 3.0 |
| | | 80 | 19.0 | 480 | 301 | 3.0 |

TABLE 3

| Polymer | Filler | Amount of filler (percent by weight) of polymer | Notched impact strength (cmkg./cm.²) | Hardness (kg./cm.²) | Flexural strength (kg./cm.²) | Melt flow |
|---|---|---|---|---|---|---|
| Low density polyethylene. | ZnS | 0 | No rupture | 160 | 80 | 8.9 |
| | | 5 | do | 162 | 84 | 8.1 |
| | | 20 | do | 165 | 89 | 7.04 |
| | | 40 | do | 170 | 90 | 5.4 |
| | | 60 | do | 176 | 94 | 4.8 |
| | | 80 | do | 176 | 101 | 2.9 |
| | ZnO | 0 | do | 160 | 80 | 8.9 |
| | | 5 | do | 163 | 86 | 8.4 |
| | | 20 | do | 168 | 95 | 7.2 |
| | | 40 | do | 171 | 100 | 5.8 |
| | | 60 | do | 189 | 102 | 5.2 |
| | | 80 | do | 196 | 107 | 4.2 |

What we claim and desire to protect by Letters Patent is:

1. A solid composition having improved mechanical properties, said composition consisting essentially of a polymer selected from the group consisting of high density polyethylene and isotactic polypropylene and from 10 to 100%, based on the weight of the polymer, of a zinc pigment selected from the group consisting of zinc sulfide, zinc oxide, and mixtures of zinc sulfide and zinc oxide.

2. The composition of claim 1 wherein the zinc pigment is zinc oxide.

3. The composition of claim 1 wherein the zinc pigment is zinc sulfide.

4. The composition of claim 1 wherein the zinc pigment is a mixture of zinc oxide and zinc sulfide.

5. The composition of claim 1 wherein the polymer is isotactic polypropylene.

6. The composition of claim 1 wherein the polymer is high density polyethylene.

7. A process for improving the hardness, flexibility, and impact strength without adversely affecting the processability of a polymer selected from the group consisting of high density polyethylene and isotactic polypropylene, which consists essentially of incorporating into said polymer prior to molding into a shaped article from 10 to 100% by weight of the polymer of a zinc pigment selected from the group consisting of zinc oxide, zinc sulfide, and mixtures thereof.

References Cited

UNITED STATES PATENTS

| | | | |
|---|---|---|---|
| 2,997,452 | 8/1961 | Makowski et al. | 260—88.2 |
| 3,084,114 | 5/1963 | Gilbert et al. | 204—159.12 |
| 3,111,499 | 11/1963 | Heuck et al. | 260—45.75 |
| 3,228,883 | 1/1966 | Di Giulio et al. | 260—41 |
| 3,257,352 | 6/1966 | Ottenheym et al. | 260—41 |

OTHER REFERENCES

Handbook of Plastics, Simonds et al., 2nd edition, 1949, TP 986 A2 S48, page 304 relied on.

Polythene, Renfrew & Morgan, 2d ed., TP 986 P56 R4, 1960, page 383 relied on.

Compounding Ingredients for Rubbers, India Rubber World, 2nd ed., TS 1890 I53, 1947, page 374 relied on.

MORRIS LIEBMAN, Primary Examiner

SAMUEL L. FOX, Assistant Examiner

U.S. Cl. X.R.

106—293, 296